3,042,676
PYRIDINIUM QUATERNARY SALTS AND METHODS OF PREPARING THE SAME
Edward F. Rogers, Middletown, and Lewis H. Sarett, Princeton, N.J., assignors to Merck & Co., Inc., Rahway, N.J., a corporation of New Jersey
No Drawing. Filed Feb. 2, 1960, Ser. No. 6,107
10 Claims. (Cl. 260—256.4)

This invention relates to novel pyridinium quaternary salts. More particularly, it relates to 1-(2-substituted-4-amino-5-pyrimidylmethyl)-lower alkylated pyridinium quaternary salts and methods of preparing the same. It is also concerned with compositions containing such salts.

According to this invention it has been found that the 1-[2-(3,3,3-trifluoropropyl)-4-amino-5-pyrimidylmethyl]-lower alkylated pyridinium and 1-(2-perfluoroloweralkyl-4-amino-5-pyrimidylmethyl)-lower alkylated pyridinium quaternary salts, wherein the pyridine ring is substituted with from one to three lower alkyl groups, have useful medicinal properties and are particularly effective in the treatment and prevention of coccidiosis in poultry.

The 1-(2-perfluoroloweralkyl-4-amino-5-pyrimidylmethyl)-lower alkylated pyridinium quaternary salts of the present invention may be represented by the formula

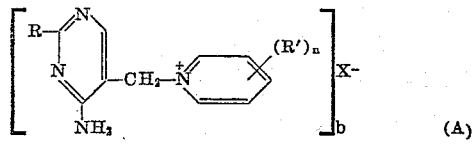

(A)

wherein R is a perfluorolower alkyl radical, R' is a lower alkyl radical, n has a value of 1–3 inclusive, X is an anion, and b is a positive number having a value such that the negative charge of the anion X is neutralized by b moles of cation. Thus, for example, when X is a monovalent anion such as a halide, b is 1.

Similarly, the 1-[2-(3,3,3-trifluoropropyl)-4-amino-5-pyrimidylmethyl]-lower alkylated pyridinium quaternary salts of this invention may be represented by the formula

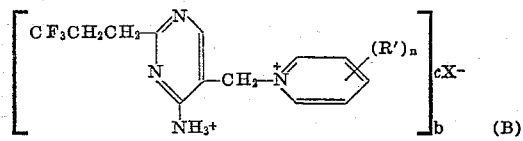

(B)

wherein R', n and X are as previously defined, and b and c are positive numbers having values such that b moles of cation is neutralized by c moles of anion X. Thus, for example, in Formula B above when X is a monovalent anion such as a halide, b is 1 and c is 2.

As will be apparent from the above structural formulae, the compounds described herein may be considered as substituted pyridines. The pyridine ring is substituted at the 1-position by a 2-perfluoroloweralkyl-4-amino-5-pyrimidylmethyl or 2-(3,3,3-trifluoropropyl)-4-amino-5-pyrimidylmethyl radical. It is further substituted with 1 or more lower alkyl groups, such as methyl, ethyl, propyl, isopropyl, butyl and amyl groups. When more than one lower alkyl group is present in the pyridine ring, that is, when n is 2 or 3, such lower alkyl groups may be the same or different. The pyrimidine moiety contains at the 2-position of the pyrimidine ring a 3,3,3-trifluoropropyl or perfluoroloweralkyl radical such as perfluoromethyl, perfluoroethyl, perfluoropropyl, perfluoroisopropyl, perfluorobutyl and the like.

With further regard to formulas A and B, the anion (designated as X) may be an inorganic anion such as chloride, bromide, iodide, nitrate, sulfate, phosphate and the like, or the anion of an organic acid such as citric, tartaric, acetic, picric, stearic, succinic, benzoic, phthalic, phenoxyacetic, embonic, abietic, 2-naphthalene sulfonic, or ethylenediamine tetraacetic acids. It may also be the anion of a polymer such as polyphosphate or polystrenesulfonate ion. The nature of the anion is not critical and any anion may be employed as long as it is not unduly toxic for poultry. However, the anions of the mineral acids and strong organic acids are preferred. It will be readily realized by those skilled in this art that an acid addition salt of the primary amino group present in the compounds represented by Formula B above, namely the 1-[2-(3,3,3-trifluoropropyl)-4-amino-5-pyrimidylmethyl]-lower alkylated pyridinium quaternary salts, will also be formed concurrently with the quaternary salt. Accordingly, it is to be understood that when the expression "salt" is used in this specification and appended claims to define the quaternary salts represented by Formula B such expression is being employed to designate the acid addition salt of such quaternary salts.

The compounds of this invention are prepared by reacting together an appropriately substituted pyrimidine and a lower alkylated pyrdine. A the pyrimidine reactant we may employ an acid addition salt of an ester of a 2-(perfluoroloweralkyl or 3,3,3-trifluoropropyl)-4-amino-5-hydroxymethyl pyrimidine and a strong acid such as a hydrohalic acid. According to the preferred process, a 2-perfluoroloweralkyl-4-amino-5-halomethyl pyrimidine hydrohalide or 2-(3,3,3-trifluoropropyl)-4-amino-5-halomethyl pyrimidine dihydrohalide is reacted directly with the alkylated pyridine. This process may be represented as follows:

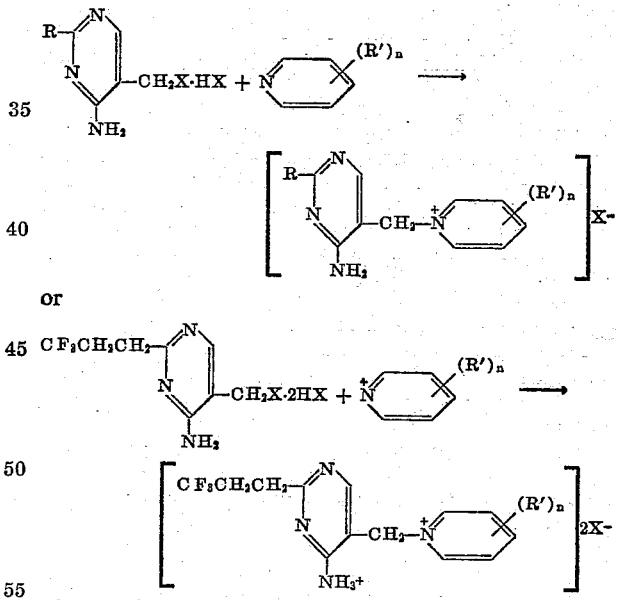

where R is a perfluoroloweralkyl radical, R' is a lower alkyl radical, n is 1–3 inclusive and X is a halogen such as chlorine or bromine.

Although the proportions of reactants are indicated to be equimolar in the above equations such proportions are not critical and an excess of either reactant can also be suitably reacted. Preferably, however, an excess of the alkylated pyridine reactant is employed.

The reaction is preferably but not necessarily carried out in the presence of an organic solvent which is inert under the reaction conditions. Illustrative of the solvents which may be employed as the reaction medium are the lower alkanols, such as methanol, ethanol, propanol and the like, acetonitrile and the N,N-dilower-alkyl alkanoamides. The reaction temperature is not critical and it is preferred to carry out the process at about room temperature. At room temperature the reaction is generally complete after from 5–20 hours or more according to the concentration of reactants and particular reactants employed. However, appreciable amounts of the desired product are obtained after about 1 hour. The products precipitate out from the reaction mixture on standing at room temperature or on the addition of a suitable precipitant such as ether and can be recovered by filtration or other conventional techniques. Alternately, the products may be recovered by evaporating the mixture substantially to dryness.

Although the acid addition salt of the 5-hydroxymethyl pyrimidine esters of hydrohalic acids, i.e. the halomethyl pyrimidine hydrohalides or dihydrohalides, are preferably employed for reaction with the alkylated pyridine, the acid addition salt of the 5-hydroxymethyl pyrimidine esters of other strong inorganic acids such as nitric, phosphoric, sulfuric and the like may be used. In addition the quaternization may also be brought about employing the acid addition salt of the 5-hydroxymethyl pyrimidine esters of strong organic acids such as the methyl sulfinate, p-toluenesulfonate, benzenesulfonate and naphthalenesulfonate esters.

The quaternization may be conducted so that the particular salt desired is obtained directly or the quaternary salt recovered from the reaction medium may be conveniently metathesized to the desired salt by techniques known in the art.

The preferred compounds of the invention are the 1 - (2 - perfluoroloweralkyl - 4 - amino - 5 - pyrimidylmethyl)-lower alkylated pyridinium and 1-[2-(3,3,3-trifluoropropyl) - 4 - amino - 5 - pyrimidylmethyl]-lower alkylated pyridinium quaternary salts having a lower alkyl radical at least at the 2- or 4-position in the pyridine ring. Included among these are the 1-(2-perfluoromethyl - 4 - amino - 5 - pyrimidylmethyl) - 2-methyl pyridinium salts, 1-(2-perfluoroethyl-4-amino-5-pyrimidylmethyl)-2-methyl pyridinium salts, 1-(2-perfluoroethyl - 4 - amino - 5 - pyrimidylmethyl) - 4 - methyl pyridinium salts, 1-(2-perfluoromethyl-4-amino-5-pyrimidylmethyl)-2-methyl-5-ethyl pyridinium salts, 1-(2-per fluoro - n - propyl - 4 - amino - 5 - pyrimidylmethyl) - 2-ethyl pyridinium salts and 1-[2-(3,3,3-trifluoropropyl)-4-amino-5-pyrimidylmethyl]-4-ethyl pyridinium salts.

As previously indicated herein, the compounds of this invention are useful in the treatment and prevention of coccidiosis in poultry. These compounds are conveniently fed to poultry as a component of the feed of the animals although they may also be given dissolved or suspended in the drinking water. According to one aspect of the invention, novel compositions are provided in which a pyridinium quaternary salt is present as an active anti-coccidial ingredient. Such compositions comprise the quaternary salts intimately dispersed in or admixed with an inert carrier or diluent. By an inert carrier is meant one that is non-reactive with respect to the quaternary and that may be administered with safety to the animals. The carrier or diluent is preferably one that is or may be an ingredient of the animal feed.

The compositions which are a preferred feature of the invention are the so-called feed supplements in which the active ingredient is present in relatively large amounts and which are suitable for addition to the poultry feed directly or after an intermediate dilution or blending step. Examples of carriers or diluents suitable for such compositions are solid orally ingestable carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The quaternary salts are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight of active ingredient, are particularly suitable for addition to poultry feeds, and compositions containing from about 5–15% by weight of coccidiostat are very satisfactory. The active compound is normally dispersed or mixed uniformly in the diluent but in some instances may be sorbed on the carrier. The optimal concentration of coccidiostat in these feed supplements will depend to some extent on the particular compound employed. Since it is convenient for the feed manufacturer to use about one pound of feed supplement for each ton of finished feed, the preferred concentration of any one of our coccidiostats in a feed supplement is partly a function of the level of active ingredient desired in the finished feed.

Examples of typical feed supplements containing a pyridinium quaternary salt dispersed in a solid inert carrier are:

| | Lbs. |
|---|---|
| A. 1-(2-perfluoroethyl-4-amino-5-pyrimidylmethyl)-2-methyl pyridinium bromide | 6.0 |
|     Wheat standard middlings | 94.0 |
| B. 1 - (2 - perfluoromethyl - 4 - amino-5-pyrimidylmethyl)-2-methyl pyridinium bromide | 10.0 |
|     Corn distillers' dried grains | 90.0 |
| C. 1 - (2 - perfluoromethyl - 4 - amino-5-pyrimidylmethyl)-2-methyl-5-ethyl pyridinium chloride | 15.0 |
|     Wheat standard middlings | 85.0 |
| D. 1 - (2 - perfluoroethyl - 4 - amino - 5-pyrimidylmethyl)-2,3-dimethyl pyridinium bromide | 12.0 |
|     Molasses solubles | 88.0 |
| E. 1 - (2 - perfluoro-n-propyl-4-amino-5-pyrimidylmethyl)-2-ethyl pyridinium chloride | 20.0 |
|     Corn germ meal | 30.0 |
|     Corn distillers' grains | 50.0 |
| F. Di[1 - (2 - perfluoroethyl - 4-amino-5-pyrimidylmethyl)-2-methyl pyridinium] embonate | 40.0 |
|     Ground oyster shells | 60.0 |
| G. Di[1 - (2 - perfluoroethyl-4-amino-5-pyrimidylmethyl)-4-n-propyl pyridinium] sulfate | 5.0 |
|     Fermentation residues | 50.0 |
|     Wheat shorts | 45.0 |
| H. 1-(2-perfluoroethyl-4-amino-5-pyrimidylmethyl)-2-methyl pyridinium chloride | 12.0 |
|     Wheat standard middlings | 88.0 |
| I. 1 - [2-(3,3,3-trifluoropropyl)-4-amino-5-pyrimidylmethyl]-2-methyl pyridinium chloride hydrochloride | 20.0 |
|     Corn germ meal | 30.0 |
|     Corn distillers' grains | 50.0 |

These and similar feed supplements are prepared by uniformly mixing the pyridinium quaternary salt with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1% to about 1.0% by weight. This dilution serves to facilitate uniform distribution of the substance in the finished feed. The finished feed is one that contains a source of fat, protein, carbohydrate, minerals, vitamins and other nutritional factors.

The amount of pyridinium quaternary salt required for optimum control of coccidiosis in poultry will, of course, vary somewhat with the specific compound or compounds employed. In general, the compounds of this invention are effective when administered in concentrations of about 0.0015% to 0.05% in the diet. For most satisfactory results from the standpoint of both efficacy and incidence of undesirable side effects it is preferred that the poultry feed contain between about 0.0025% and 0.025% by weight of the pyridinium salt. When the pyridinium salts are to be employed as therapeutic agents, the higher concentrations may be used for relatively short periods of time. Thus, concentrations of about 0.02% to 0.05% by weight of the feed may be advantageously administered in treating an established outbreak of coccidiosis. When these compounds are employed as therapeutic agents it is desirable to employ the lowest levels that afford fully adequate control of coccidiosis in order to eliminate as far as possible any risk of side effects that might appear on prolonged feeding of the compounds.

Many of the pyridinium quaternary salts of this invention are desirably or advantageously administered to poultry by way of the drinking water of the birds. This method of treatment is often employed in the therapeutic use of our compounds since poultry with coccidiosis are apt to consume less solid feed than normal birds. The water-soluble quaternary salts may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from 1–25% by weight of active compound are suitable.

The following examples are added to illustrate the production of specific compounds provided by this invention but it is understood that the invention is not to be restricted thereby to the embodiments disclosed in these examples.

EXAMPLE 1

1-(2-Perfluoroethyl-4-Amino-5-Pyrimidylmethyl)-4-Methyl Pyridinium Bromide

To 10 g. of 2-perfluoroethyl-4-amino-5-pyrimidylmethyl bromide hydrobromide suspended in 45 ml. of acetonitrile is added 10 ml. of 4-methyl pyridine. After standing overnight at room temperature, the reaction mixture is evaporated under vacuum at 40° C. to remove the solvent. The resulting solid material is then washed with about 50 ml. of warm ethyl acetate and crystallized from a mixture of 5% acetone–95% ethyl acetate. The crystalline 1-(2-perfluoroethyl-4-amino-5-pyrimidylmethyl)-4-methyl pyridinium bromide thus obtained melts at 194–195° C.

Analysis.—Calcd. for $C_{13}H_{12}N_4F_5Br$: C, 39.19; H, 2.98; N, 13.60. Found: C, 39.11; H, 3.03; N, 14.04.

EXAMPLE 2

1-(2-Perfluoromethyl-4-Amino-5-Pyrimidylmethyl)-2-Methyl Pyridinium Bromide

To 2 g. of 2-perfluoromethyl-4-amino-5-pyrimidylmethyl bromide hydrobromide suspended in 10 ml. of acetonitrile is added 2 ml. of 2-methyl pyridine. After allowing the reaction mixture to stand for 3 hours at room temperature a small volume of ether is added to precipitate the quaternary salt which is then filtered off and washed with acetone. The 1-(2-perfluoromethyl-4-amino-5-pyrimidylmethyl)-2-methyl pyridinium bromide thus obtained melts at 208° C. with decomposition.

Analysis.—Calcd. for $C_{12}H_{12}N_4F_3Br$: C, 41.28; H, 3.47; N, 16.05. Found: C, 40.89; H, 3.32; N, 15.61.

EXAMPLE 3

1-(2-Perfluoroethyl-4-Amino-5-Pyrimidylmethyl)-2-Methyl Pyridinium Bromide

To a suspension of 38.7 g. of 2-perfluoroethyl-4-amino-5-pyrimidylmethyl bromide hydrobromide in 200 ml. of acetonitrile is added with stirring 40 ml. of α-picoline. After a short time crystals of 1-(2-perfluoroethyl-4-amino-5-pyrimidylmethyl)-2-methyl pyridinium bromide begin to appear. The reaction mixture is stirred for about 20 hours at room temperature and then chilled to 0° C. The crystalline material is then collected by filtration and washed first with three 10 ml. portions of cold 50% ethyl alcohol, then ether and dried to constant weight. The crystals of 1-(2-perfluoroethyl-4-amino-5-pyrimidylmethyl)-2-methyl pyridinium bromide thus obtained has a melting point of 202–204° C.

EXAMPLE 4

1-(2-Perfluoro-n-Propyl-4-Amino-5-Pyrimidylmethyl)-2-Ethyl Pyridinium Chloride

To 10 g. of 2-perfluoro-n-propyl-4-amino-5-pyrimidylmethyl chloride hydrochloride suspended in 50 ml. of methanol is added 10 ml. of 2-ethyl pyridine. After allowing the reaction mixture to stand overnight at room temperature ether is added to precipitate the 1-(2-perfluoro - n - propyl-4-amino-5-pyrimidylmethyl)-2-ethyl pyridinium chloride which is then recovered by filtration, washed with acetone and dried to constant weight.

EXAMPLE 5

1-(2-Perfluoromethyl-4-Amino-5-Pyrimidylmethyl)-2-Methyl-5-Ethyl Pyridinium Chloride To 5 g. of 2-perfluoromethyl-4-amino-5-pyrimidylmethyl chloride hydrochloride suspended in 25 ml. of acetonitrile is added 5 ml. of 2-methyl-5-ethyl pyridine. To the reaction mixture, after standing for 12 hours at room temperature, is added sufficient ether to precipitate the 1-(2-perfluoromethyl-4-amino-5-pyrimidylmethyl)-2-methyl-5-ethyl pyridinium chloride which is then recovered by filtration, washed with acetone and dried to constant weight.

EXAMPLE 6

One gram of 1-(2-perfluoromethyl-4-amino-5-pyrimidylmethyl)-2-methyl pyridinium bromide is dissolved in 4 ml. of concentrated hydrochloric acid. The resulting solution is then carefully diluted with 60 ml. of acetone and the precipitate of 1-(2-perfluoromethyl-4-amino-5-pyrimidylmethyl)-2-methyl pyridinium chloride which forms is recovered by filtration. This salt is then dissolved in about 2 ml. of concentrated hydrochloric acid and the solution slowly diluted with about 40 ml. of acetone to precipitate the 1-(2-perfluoro-methyl-4-amino-5-pyrimidylmethyl)-2-methyl pyridium chloride which is then recovered by filtration and dried to constant weight.

EXAMPLE 7

1-[2-(3,3,3-Trifluoropropyl)-4-Amino-5-Pyrimidylmethyl]-4-Ethyl Pyridinium Bromide Hydrobromide To 5 g. of 2-(3,3,3-trifluoropropyl)-4-amino-5-pyrimidylmethyl bromide dihydrobromide suspended in 25 ml. of acetonitrile is added 5 ml. of 4-ethyl pyridine. After allowing the mixture to stand for 15 hours at room temperature sufficient ether is added to precipitate the 1 - [2 - (3,3,3 - trifluoropropyl)-4-amino-5-pyrimidylmethyl] - 4 - ethyl pyridinium bromide hydrobromide which is then recovered by filtration, washed with acetone and dried to constant weight.

EXAMPLE 8

1-(2-Perfluoroethyl-4-Amino-5-Pyrimidylmethyl)-2-n-Propyl Pyridinium Bromide

To 10 g. of 2-perfluoroethyl-4-amino-5-pyrimidylmethyl bromide hydrobromide is added with stirring 10 ml. of 2-n-propyl pyridine. After allowing the reaction mixture to stand overnight at room temperature ether is added to precipitate the 1-(2-perfluoroethyl-4-amino-5-pyrimidylmethyl) - 2 - n - propyl pyridinium bromide which is then recovered by filtration, washed with 50 ml. of warm ethyl acetate and dried to constant weight.

EXAMPLE 9

*1-(2-Perfluoroethyl-4-Amino-5-Pyrimidylmethyl)-2-Methyl Pyridinium Chloride*

1.9 g. of p-toluene sulfonyl chloride is added gradually with shaking to a cooled (0–5° C.) solution of 2.5 g. of 2-perfluoroethyl-4-amino-5-hydroxymethyl pyrimidine in 10 ml. of 2-methyl pyridine. The reaction mixture, after standing three hours in an ice bath and 15 hours at room temperature, is evaporated in vacuo. The residue remaining is then dissolved in 20 ml. of water, acidified with hydrochloric acid and poured over a column of Amberlite IRA–400 ion exchange resin on the chloride cycle. Amberlite IRA–400 (available from the Rohm & Haas Co., Philadelphia, Pa.) which is a strongly basic anion exchange resin containing from 3% to 5% divinylbenzene may be prepared in the manner described in the example of U.S. Pat. No. 2,591,573. The eluate is then evaporated to dryness yielding 1-(2-perfluoroethyl - 4 - amino - 5 - pyrimidylmethyl)-2-methyl pyridinium chloride.

EXAMPLE 10

*Di[1-(2-Perfluoromethyl-4-Amino-5-Pyrimidylmethyl)-2-Methyl Pyridinium]-1,5-Naphthalene Disulfonate*

3.4 g. of 1-(2-perfluoromethyl-4-amino-5-pyrimidylmethyl)-2-methyl pyridinium chloride is dissolved in 10 ml. of water. To this solution is added 1.75 g. of naphthalene-1,5-disulfonic acid. After allowing the reaction mixture to stand in ice water for 2 hours, the solid di[1 - (2 - perfluoromethyl-4-amino-5-pyrimidylmethyl)-2-methyl pyridinium]-1,5-naphthalene disulfonate which forms is recovered by filtration, washed with water and dried to constant weight.

EXAMPLE 11

*Di[1-(2-Perfluoroethyl-4-Amino-5-Pyrimidylmethyl)-2-Methyl Pyridinium] Embonate*

2.4 g. of 1-(2-perfluoroethyl-4-amino-5-pyrimidylmethyl)-2-methyl pyridinium bromide dissolved in 10 ml. of water is added to a hot solution of 2.2 g. of sodium embonate in 40 ml. of water. After allowing the reaction mixture to stand at room temperature for several minutes, the precipitate of di[1-(2-perfluoroethyl-4-amino-5-pyrimidylmethyl) - 2 - methyl pyridinium] embonate which forms is recovered by filtration, washed with water and dried to constant weight.

EXAMPLE 12

When the quaternary salts of Examples 1, 3, 7 and 8 are treated with hydrochloric acid by the method of Example 6 the corresponding chloride quaternary salts are obtained.

EXAMPLE 13

The 2 - (3,3,3-trifluoropropyl)-4-amino-5-halomethyl and 2-perfluoroloweralkyl-4-amino-5-halomethyl pyrimidines employed in making the quaternary compounds of this invention may be prepared in the following manner:

A. *2-[Perfluoroloweralkyl or (3,3,3-Trifluoropropyl)]-4-Amino-5-Bromomethyl Pyrimidine*

5. g. of 2-trifluoromethyl-4-amino-5-hydroxymethyl pyrimidine is dissolved in 30 ml. of a 30% solution of hydrogen bromide in acetic acid. The resulting mixture is heated at 70° C. for six hours and then allowed to stand at room temperature for 15 hours. The crystalline 2-trifluoromethyl-4-amino-5-bromomethyl pyrimidine hydrobromide which forms is then recovered by filtration, washed with ether and dried to constant weight.

When the above reaction is carried out with 2-perfluoroethyl-4-amino-5-hydroxymethyl pyrimidine there is obtained 2-perfluoroethyl-4-amino-5-bromomethyl pyrimidine hydrobromide. When 2-perfluoro-n-propyl-4-amino-5-hydroxymethyl pyrimidine is employed as the starting material the end product is 2-perfluoro-n-propyl-4-amino-5-bromomethyl pyrimidine hydrobromide. When 2-(3,3,3-trifluoropropyl)-4-amino-5-hydroxymethyl pyrimidine is utilized as the starting compound there is obtained 2-(3,3,3-trifluoropropyl)-4-amino-5-bromomethyl pyrimidine dihydrobromide.

B. *2-[Perfluoroloweralkyl or (3,3,3-Trifluoropropyl)]-4-Amino-5-Hydroxymethyl Pyrimidine*

The 2-trifluoromethyl-4-amino-5-hydroxymethyl pyrimidine employed in part A may be prepared as described by Barone et al. in the J. of Org. Chem. 24, 199 (1959). Barone et al. describe the preparation of the above compound starting with perfluoroacetamidine. When perfluoropropionamidine, perfluorobutyramidine and 4,4,4-trifluorobutyramidine are utilized in this process in place of perfluoroacetamidine, there are obtained respectively 2-perfluoroethyl-4-amino-5-hydroxymethyl pyrimidine, 2-perfluoro-n-propyl-4-amino-5-hydroxymethyl pyrimidine and 2-(3,3,3-trifluoropropyl)-4-amino-5-hydroxymethyl pyrimidine.

The perfluoroalkylamidines referred to above may be prepared as described in U.S. Patent No. 2,676,985, issued April 27, 1954. The 4,4,4-trifluorobutyramidine also referred to above may be prepared in the following manner:

(1) A mixture of 100 g. of powdered 4,4,4-trifluorobutyramide (prepared as described by Henne and Stewart, J. Am. Chem. Soc. 77, 1901 (1955)) and 200 g. of phosphorus pentoxide is placed in a distilling flask fitted with a condenser and receiver. The flask is slowly immersed in an oil bath which is maintained at a temperature of 200°–230° C. As the reaction proceeds the 4,4,4-trifluorobutyronitrile which forms distills from the reaction mixture. After 5 hours of heating, vacuum is applied to the system to complete the distillation of the nitrile from the phosphoric acid residue. The crude nitrile obtained is then distilled from 10 g. of phosphorus pentoxide at atmospheric pressure.

(2) To a solution of 86 g. of 4,4,4-trifluorobutyronitrile in 35.4 g. of absolute alcohol maintained at 0° C. is added 28.1 g. of dry hydrogen chloride. The reaction mixture is maintained at 0° C. for four days. 500 ml. of ether is then added and the reaction mixture cooled to about −30° C. The crystalline 4,4,4-trifluorobutyrimido ethyl ester hydrochloride which forms is then recovered by filtration and washed well with ether.

(3) 100 g. of 4,4,4-trifluorobutyrimido ethyl ester hydrochloride is added to a stirred solution of 20 g. of ammonia in 200 ml. of ethanol. After 3 hours at room temperature the reaction mixture is filtered and then concentrated in vacuo to a thick syrup. An equal volume of acetone is then added and the precipitate of 4,4,4-trifluorobutyramidine hydrochloride which forms is recovered by filtration and washed with acetone. This material is then treated with an equal molar amount of sodium ethoxide in ethanol to obtain the free base.

Any departure from the above description which conforms to the present invention is intended to be included within the scope of the claims.

What is claimed is:

1. A pyridinium compound selected from the group consisting of compounds of the formula

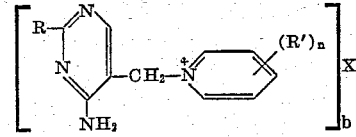

wherein R is a perfluoroloweralkyl radical, R' is a lower alkyl radical, n has a value of 1 to 3 inclusive, X is a nontoxic anion, and b is a positive number having a value such that the negative charge of the anion X is neutralized by $b$ moles of cation and

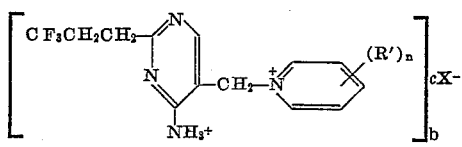

wherein R′, $n$ and X are as previously defined, and $b$ and $c$ are positive numbers having values such that the positive charge of $b$ moles of cation is neutralized by $c$ moles of anion X.

2. 1 - (2 - perfluoroloweralkyl - 4 - amino - 5 - pyrimidylmethyl)-lower alkylated pyridinium quaternary salt.

3. 1 - [2 - (3,3,3-trifluoropropyl)-4-amino-5-pyrimidylmethyl]-lower alkylated pyridinium quaternary salt.

4. 1 - (2 - perfluoroloweralkyl - 4 - amino-5-pyrimidylmethyl)-2-lower alkyl pyridinium quaternary salt.

5. 1 - (2 - perfluoroloweralkyl - 4-amino-5-pyrimidylmethyl)-4-lower alkyl pyridinium quaternary salt.

6. 1 - (2 - perfluoromethyl - 4 - amino - 5 - pyrimidylmethyl)-2-methyl pyridinium halide.

7. 1 - (2 - perfluoroethyl - 4 - amino - 5 - pyrimidylmethyl)-2-methyl pyridinium halide.

8. 1 - (2 - perfluoroethyl - 4 - amino - 5 - pyrimidylmethyl)-4-methyl pyridinium halide.

9. The process which comprises reacting an acid addition salt of a 2-perfluoroloweralkyl-4-amino-5-hydroxymethyl pyrimidine ester of a strong acid with a lower alkylated pyridine to form a 1-(2-perfluoroloweralkyl-4-amino-5-pyrimidylmethyl)-lower alkylated pyridinium quaternary salt.

10. The process which comprises reacting an acid addition salt of a 2-(3,3,3-trifluoropropyl)-4-amino-5-hydroxymethyl pyrimidine ester of a strong acid with a lower alkylated pyridine to form a 1-[2-(3,3,3-trifluoropropyl)-4-amino-5-pyrimidylmethyl]-lower alkylated pyridinium quaternary salt.

References Cited in the file of this patent
UNITED STATES PATENTS

| | | |
|---|---|---|
| 2,146,083 | Miller | Feb. 7, 1939 |
| 2,279,421 | Tisdale | Apr. 14, 1942 |
| 2,350,265 | Williams et al. | May 30, 1944 |
| 2,587,262 | Wilson et al. | Feb. 28, 1952 |